US009348011B2

(12) United States Patent　　(10) Patent No.: US 9,348,011 B2
Cornic et al.　　(45) Date of Patent: May 24, 2016

(54) LOCATION SYSTEM FOR A FLYING CRAFT

(75) Inventors: Pascal Cornic, Guilers (FR); Patrick Garrec, Merignac (FR); Jean-Paul Artis, Plouzane (FR)

(73) Assignee: Thales, Courbevoie (FR)

( * ) Notice: Subject to any disclaimer, the term of this patent is extended or adjusted under 35 U.S.C. 154(b) by 398 days.

(21) Appl. No.: 13/607,739

(22) Filed: Sep. 9, 2012

(65) Prior Publication Data

US 2014/0028486 A1　　Jan. 30, 2014

(30) Foreign Application Priority Data

Sep. 9, 2011　(FR) ...................................... 11 02735

(51) Int. Cl.
*G01S 5/02*　　(2010.01)
*G01S 1/14*　　(2006.01)
*F41G 7/30*　　(2006.01)

(52) U.S. Cl.
CPC ............... *G01S 5/0247* (2013.01); *F41G 7/301* (2013.01); *F41G 7/305* (2013.01); *G01S 1/14* (2013.01)

(58) Field of Classification Search
CPC ............... G01S 1/02; G01S 1/08; G01S 1/14; G01S 5/02; G01S 5/0247; F41G 7/20; F41G 7/30; F41G 7/301; F41G 7/305
USPC .................. 342/42–51, 61–65, 118, 146, 147, 342/149–157, 175, 188–197, 350, 351, 385, 342/417, 428, 430, 432; 89/6, 6.5; 244/3.1–3.23, 3.24–3.3; 356/138, 140, 356/141.2, 141.3
See application file for complete search history.

(56) References Cited

U.S. PATENT DOCUMENTS

| | | | | | |
|---|---|---|---|---|---|
| 4,750,689 | A | * | 6/1988 | Yf ................................. | 244/3.14 |
| 4,910,410 | A | * | 3/1990 | Workman .................... | 356/141.3 |
| 4,967,981 | A | * | 11/1990 | Yff .............................. | 244/3.21 |
| 4,979,696 | A | * | 12/1990 | Yff .............................. | 244/3.14 |
| 4,997,144 | A | * | 3/1991 | Wolff et al. ................. | 244/3.14 |
| 5,039,029 | A | * | 8/1991 | Taylor et al. ................ | 244/3.11 |
| 5,099,246 | A | * | 3/1992 | Skagerlund ................. | 244/3.14 |

(Continued)

FOREIGN PATENT DOCUMENTS

| WO | 99/53259 A1 | 10/1999 |
|---|---|---|
| WO | 01/86229 A2 | 11/2001 |

OTHER PUBLICATIONS

Preliminary Search Report and Written Opinion for French application No. 1102735 (Apr. 24, 2012).

*Primary Examiner* — Bernarr Gregory
(74) *Attorney, Agent, or Firm* — Baker & Hostetler LLP

(57) ABSTRACT

A location and guidance system including a flying craft and a reception device. The flying craft includes a plurality of antennas distributed around its fuselage and emitting rearwards with rectilinear polarization, the emitted signals being specific to each antenna, the positions and the dimensions of the antennas being configured such that the body of the flying craft avoids by masking for at least one antenna the reflections of the signal emitted by this antenna off the ground or off lateral obstacles whatever the position of the flying craft. The reception device is placed substantially on a trajectory axis of the flying craft and configured to be oriented to sight the rear thereof and includes at least two single-pulse antennas operating in orthogonal planes determines a position of the flying craft by analyzing the emitted signals received by the antennas of the reception device.

3 Claims, 6 Drawing Sheets

(56) References Cited

U.S. PATENT DOCUMENTS

| | | | |
|---|---|---|---|
| 5,163,637 A * | 11/1992 | Hansen | 244/3.21 |
| 5,218,361 A * | 6/1993 | Avila et al. | 342/430 |
| 5,233,901 A * | 8/1993 | Nilsson et al. | 89/6.5 |
| 5,344,099 A * | 9/1994 | Pittman et al. | 244/3.13 |
| 5,372,334 A * | 12/1994 | Cuadros | 244/3.11 |
| 5,414,430 A * | 5/1995 | Hansen | 342/188 |
| 6,016,990 A * | 1/2000 | Small | 244/3.11 |
| 6,450,442 B1 * | 9/2002 | Schneider et al. | 244/3.14 |
| 6,469,654 B1 * | 10/2002 | Winner et al. | 342/51 |
| 6,483,455 B2 * | 11/2002 | Fleury et al. | 342/62 |
| 6,572,052 B1 * | 6/2003 | Hansen | 244/3.11 |
| 6,724,341 B1 * | 4/2004 | Pereira et al. | 342/62 |
| 6,727,843 B1 * | 4/2004 | Hansen | 342/62 |
| 7,023,380 B2 * | 4/2006 | Schneider | 244/3.11 |
| 7,193,556 B1 * | 3/2007 | Pereira et al. | 342/62 |
| 7,298,255 B1 * | 11/2007 | Pereira et al. | 342/146 |
| 7,589,663 B1 * | 9/2009 | Goldman et al. | 342/62 |
| 2005/0184192 A1 | 8/2005 | Schneider | |

* cited by examiner

LOCATION SYSTEM FOR A FLYING CRAFT

CROSS-REFERENCE TO RELATED APPLICATIONS

This application claims priority to foreign French patent application No. FR 11 02735, filed on Sep. 9, 2011, the disclosure of which is incorporated by reference in its entirety.

FIELD OF THE DISCLOSED SUBJECT MATTER

The invention relates to a flying craft location system, a flying craft and a reception device. It applies notably to the field of high-precision locating of flying craft and to guidance towards a designated objective.

BACKGROUND

Two principal families of flying craft guidance systems exist.

The first family encompasses autoguidance systems in which the flying craft is capable, by itself, of steering towards an objective. These autonomous systems customarily implement onboard inertial means, associated with a laser or infrared electromagnetic designation assembly pointed in the direction of the objective. In such a case, the volume and weight of the onboard electronics is appreciable and directly impacts the cost of the craft.

The second family encompasses guidance systems remotely controlled from a fixed ground installation, or from an installation onboard a ground vehicle or an installation which is likewise airborne. These systems customarily use an active or passive probe capable of locating the flying craft with respect to the objective. It is beneficial in this case to use radar techniques in active or passive mode, this technique allowing "all weather" operation.

The active radar mode is, however, difficult to use when the equivalent cross-sectional area of the flying craft to be guided is small. Moreover, this mode does not allow direct identification of the target. This is why the use of a passive mode based on an emitter onboard the flying craft is preferred, the said craft then being located by a ground system or one which is itself onboard a vehicle. However, when the craft flies at an altitude of a few decimeters or a few meters, elevational location turns out to be very tricky because of the signal reflections off the ground. Moreover, location may also be disturbed in the horizontal plane by lateral reflections off surrounding objects such as for example buildings. Moreover, an onboard emitter does not make it possible to measure the distance traversed if it does not have a responder function. If a responder function is implemented at the level of the emitter, the cost and volume of the electronics onboard the flying craft grow appreciably.

When the flying craft spins, it may be beneficial to know the angle of roll at each instant, to guarantee effective guidance. This information is not accessible with conventional systems, be it within the framework of autoguided systems or systems guided from a fixed ground installation or one which is itself onboard a terrestrial or airborne vehicle.

SUMMARY

An aim of the invention is notably to correct the aforementioned drawbacks.

For this purpose the subject of the invention is a location and guidance system comprising a flying craft and a reception device. The said craft comprises a plurality of antennas distributed around its fuselage and emitting rearwards from the said craft with rectilinear polarization, the emitted signals being specific to each antenna, the positions and the dimensions of the said antennas being chosen in such a way that the body of the flying craft avoids by masking for at least one antenna the reflections of the signal emitted by this antenna off the ground or off lateral obstacles whatever the position of the flying craft. The reception device is placed substantially on the trajectory axis of the flying craft and oriented in its direction so as to sight the rear thereof and comprising at least two single-pulse antennas operating in orthogonal planes and means for determining the position of the flying craft by analysing the signals emitted by the antennas of the craft and received by the antennas of the reception device.

According to one aspect of the invention, a modulation control circuit characterizing the signal emitted by each of the antennas is used by the flying craft in such a way that the reception device is able to identify and to process, separately, the signals emitted by each of these antennas.

A waveform generator is for example onboard the flying craft and delivers a sinusoidal signal to each of the antennas sequentially and in a periodic manner on a different frequency.

In one embodiment, a dead emission time S is contrived periodically so as to allow the synchronization of a reception device.

The subject of the invention is also a flying craft comprising a plurality of antennas distributed around its fuselage and emitting rearwards from the said craft with rectilinear polarization, the emitted signals being specific to each antenna, the positions and the dimensions of the said antennas being chosen in such a way that the body of the flying craft avoids by masking for at least one antenna the reflections of the signal emitted by this antenna off the ground or off lateral obstacles whatever the position of the flying craft.

According to one aspect of the invention, the antennas are embodied on the basis of rectilinear microwave leakage lines, disposed substantially perpendicularly to the fuselage of the craft.

According to another aspect of the invention, fins serve to guide the craft, the emission antennas being fixed to the said fins.

The subject of the invention is also a reception device comprising at least two single-pulse antennas pointed in the same direction of sighting and operating in orthogonal planes and means for identifying and processing, separately, the signals emitted by each of these antennas of a flying craft such as described above. The said means are adapted in such a way that the signals emitted by each of these antennas are identified and processed separately and that the signals received disturbed by reflections are automatically detected and rejected.

Two reception chains are for example employed, each chain comprising a frequency-controlled coherent reference oscillator, low noise amplifiers and filters, a mixer and analogue-digital conversion means, means of signal coding and processing based on an FFT fast Fourier transform and common processing means shared by the two chains.

The angular location in elevation and in bearing is for example determined by two-plane single-pulse deviometry on the basis of the signals emitted by the antennas of the flying craft. According to one aspect of the invention, the Doppler frequency of the signal emitted by the craft on each of the emission sources is measured, the distance traversed by the craft being deduced by temporal integration of this measurement.

According to another aspect of the invention, the value of the roll and the rate of the roll of the craft are estimated by measuring the amplitude of the signal received on two orthogonal rectilinear polarizations.

In one embodiment the component to be rejected of the signals received is identified by verifying the amplitude coherence of the said signals received over time.

In another embodiment, at least two identical antennas of like polarization are used in reception, disposed at two different heights, the measurements corresponding to signals of different amplitudes received simultaneously on the two antennas being rejected.

In another embodiment, four antennas are used, two antennas with vertical polarization being distributed at different heights and allowing elevation measurement, two other antennas having horizontal polarization and distributed on a horizontal plane to allow bearing measurement.

According to one aspect of the invention, the position of the reception device is situated substantially at ground level, the said device being fixed or mobile.

In an alternative manner, the reception device is onboard an aircraft.

An advantage of the invention is notably to avoid the use of onboard gyroscopes. Another advantage is the compactness and the low cost of the reception device, it being possible for the said device to be embodied with the aid of technologies developed for mass markets such as radars for automobiles operating at millimetric waves.

BRIEF DESCRIPTION OF THE DRAWINGS

Other characteristics and advantages of the invention will become apparent with the aid of the description which follows given by way of nonlimiting illustration, offered with regard to the appended drawings among which.

DETAILED DESCRIPTION

Figure 1:
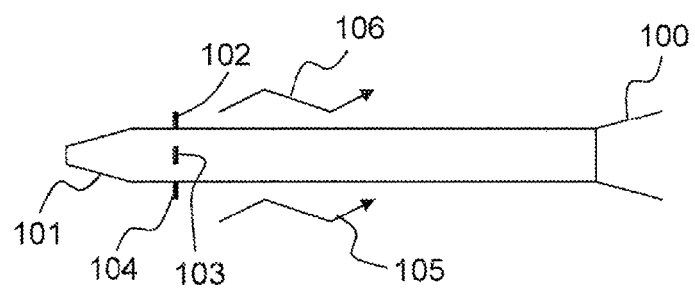
FIG. 1 gives an exemplary flying craft that can be guided by the system according to the invention.

FIG. 1 gives an exemplary flying craft that can be guided by the system according to the invention. This flying object is for example of cylindrical shape, comprises a motor 100 at the rear and terminates at the front in a tapering cone 101.

The guidance system according to the invention associates a miniature emitter onboard the flying craft called the onboard emission device. The system also comprises a reception device. In a preferred embodiment of the invention, the reception device is situated substantially at the level of the terrestrial surface, be it on a road or on the sea. Moreover, the said reception device is fixed or mobile. It may therefore be onboard a vehicle or a boat. In another embodiment, the reception device is onboard an aircraft.

The onboard emission device operates at low power at millimetric waves and feeds several antennas in a sequential or simultaneous manner, these antennas being distributed around the cylindrical-shaped flying craft and radiating with rectilinear polarization rearwards from the object. In a preferred embodiment, these antennas emit with local vertical rectilinear polarization, that is to say for each along an axis perpendicular to the plane tangential to the fuselage at their point of location on the latter.

In this device, the dimension and the position of the antennas are optimized so that the body of the flying craft prohibits by masking the reflections of the emitted wave off the ground or off lateral obstacles, for at least one antenna whatever the position of the craft.

The reception device may be placed substantially on the trajectory axis, close to the place of the point of departure of the flying craft and oriented in the direction of the said craft so as to sight the rear thereof. This receiver is able to receive the signals emitted by the onboard device and comprises at least two single-pulse antennas operating in orthogonal planes, and employs a processing of the signal received allowing the detection, the measurement of position in three dimensions, the trajectory and the angle of roll of the flying object.

The onboard emission device simultaneously or sequentially feeds several antennas 102, 103, 104 distributed according to a circle centred on the fuselage of the craft and whose beams 105, 106 are oriented rearwards from the latter.

In order to characterize each antenna 102, 103, 104 a specific modulation or a coding is allocated to each of them.

The antennas 102, 103, 104 are disposed in such a way that the radiation of at least one of them is not impaired by the reflections off the ground, and that in the presence of a lateral obstacle on one side of the trajectory, the radiation of at least one other is not impaired by the reflections off this obstacle, whatever the position of the craft. These antennas 102, 103, 104 are oriented substantially perpendicularly to the fuselage.

The reception device establishes an angular location in elevation and in bearing by two-plane single-pulse deviometry on the basis of the signals emitted by each of the emission sources. At each instant, the measurements disturbed by the reflections are automatically detected and rejected by the system, so as to retain only the valid measurement or measurements.

In parallel, the reception device measures the Doppler frequency of the signal emitted by the craft on each of the emission sources, and deduces therefrom by temporal integration the distance traversed by the craft.

Thirdly, this device establishes the value of the roll and the rate of the roll of the craft by measuring the amplitude of the signal received on two orthogonal rectilinear polarizations.

Figure 2:
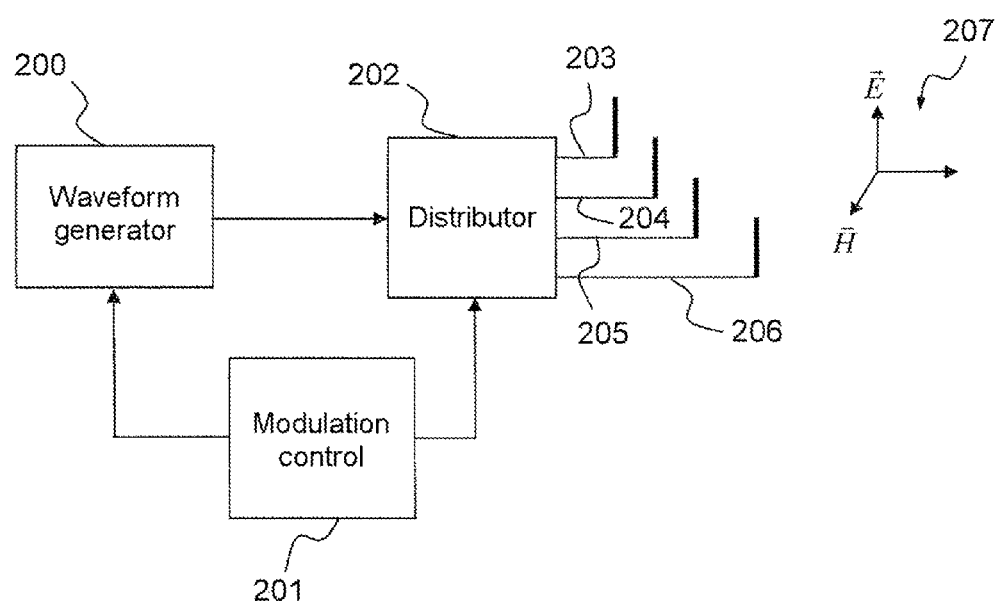
FIG. 2 presents a simplified example of the onboard emission device.

FIG. 2 presents a simplified example of the onboard emission device operating for example at millimetric waves. This device comprises at least one millimetric waveform generator 200, a modulation control circuit 201, a distributor 202 and four antennas 203, 204, 205, 206 radiating with rectilinear polarization 207. In a preferred embodiment, the emission frequency is of the order of 80 GHz.

The function of the modulation control circuit 201 is to characterize the signal emitted by each of the antennas, in such a way that the reception device is able to identify and to process, separately, the signals emitted by each of these antennas. The modulation can be performed in amplitude, in phase or else in frequency. In a preferred embodiment, the waveform generator delivers a sinusoidal signal to each of the antennas on a different frequency.

Figure 3:
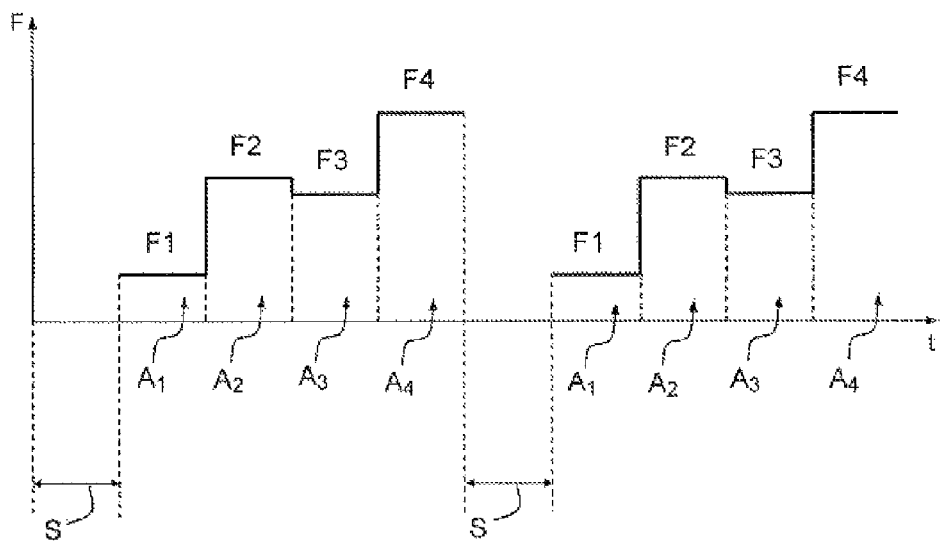
FIG. 3 gives an exemplary emission of the emission device included in the flying craft.

FIG. 3 gives an exemplary onboard emission device. By way of example, the waveform generator 200 sequentially and periodically feeds each of the antennas referenced $A_1$ to $A_N$ by portions of sinusoid of frequencies F1 to FN in such a way that the continuity of the phase is ensured between the various portions. An exemplary cycle is illustrated with the aid of FIG. 3 hereinbelow in the case where 4 antennas $A_1$ to $A_4$ are used, each antenna radiating during a fifth of the cycle time. In this example, a dead time S is contrived during a fifth of the cycle time so as to allow the synchronization of the receiver.

In such an embodiment, the distributor 202 acts as distribution circuit and may be a switching circuit with one input and four outputs, known to the person skilled in the art under the term SP4T, the initials stemming from the expression "Single-Pole Four-Throw".

The antennas $A_1$ to $A_N$ are embodied for example on the basis of rectilinear microwave leakage lines, disposed substantially perpendicularly to the fuselage of the craft.

The longitudinal dimension of the antennas, their orientation and their position are optimized in such a way that the radiation under the plane tangential to the fuselage on which the base of the relevant antenna rests is very weak.

Figure 4:
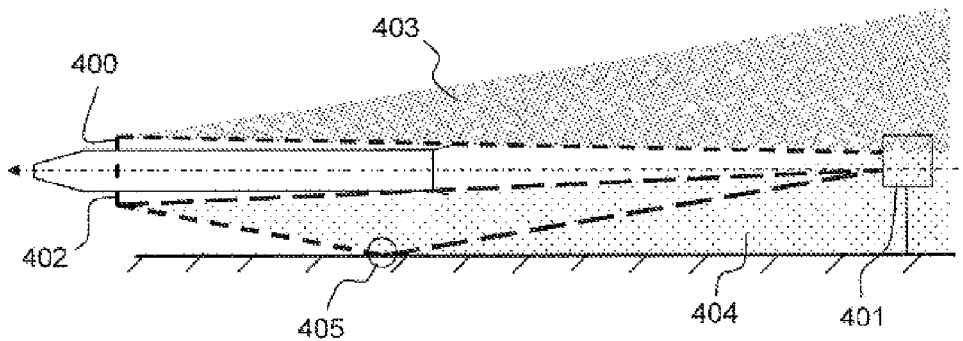
FIG. 4 presents an exemplary configuration of antennas onboard a flying craft guided by the system according to the invention.

FIG. 4 presents an exemplary configuration of antenna onboard a flying craft 406 guided by the system according to the invention. In this example, the reception device 401 is a fixed reception device placed at ground level. If several antennas distributed regularly around the fuselage are used, it is apparent that the signal 403 emitted towards the reception device 401 by the antenna 400 situated above the craft may not reach the ground since the latter is masked by the fuselage, whereas the signal 404 emitted by the opposite antenna 402 undergoes reflections 405 off the ground. Under such conditions, the signal emitted by the antenna 400 can be used in an optimal manner by the receiver to estimate notably the elevation position of the flying craft.

This principle may be complied with whatever the roll undergone by the flying craft by distributing at least four antennas around the fuselage in a regular manner, and by optimizing the length of the elementary antennas with respect to the diameter of the fuselage in such a way that at least one antenna is rendered insensitive to reflection effects.

Figure 5:
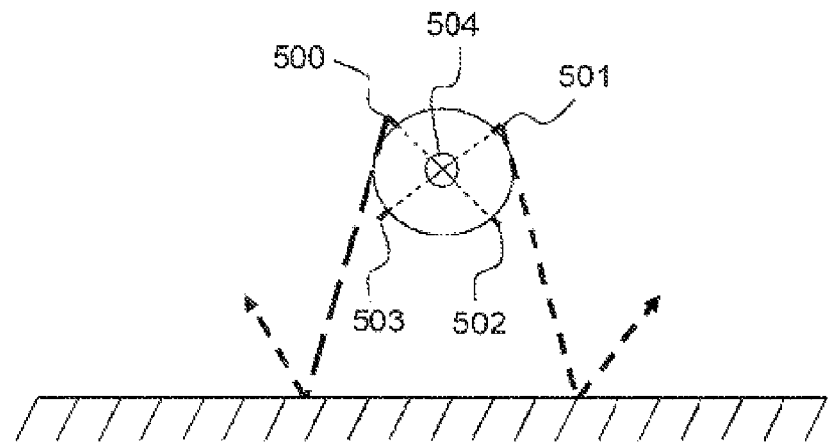
FIG. 5 illustrates an exemplary view from the rear of the flying craft comprising the onboard emission device and corresponding to the limit case of a 45° roll.

FIG. 5 illustrates an exemplary view from the rear of the flying craft comprising the onboard emission device and corresponding to the limit case of a 45° roll. The signals emitted by the antennas 500 and 501 may not after reflection off the ground reach the receiver which is placed on the axis of the trajectory 504 of the craft, on account of their angle of incidence on the ground. On the other hand, the signals emitted by the antennas 502 and 503 can after reflection off the ground reach the receiver which is placed along the axis of the trajectory 504.

In the same manner, when an antenna is able to illuminate a lateral obstacle situated along the trajectory of the craft, the antenna situated on the opposite side of the fuselage is not affected by the reflections off this obstacle.

In a preferred embodiment, the antennas are retracted into the fuselage before launch and deployed automatically immediately upon exit from the launch tube.

The circuits for generating the waveform, for controlling modulation and distribution may be integrated into the fuselage and linked to the antennas by a flexible microwave link allowing the deployment of the antennas.

In an advantageous embodiment, the emission antennas are fixed to the fins also called "canards" and serving to guide the craft.

Figure 6:
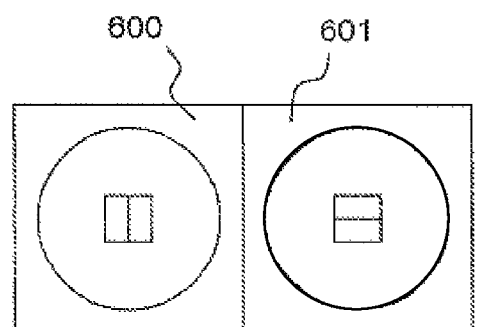
FIG. 6 presents a first exemplary configuration of antennas used in a reception device.

FIG. 6 presents a first exemplary configuration of antennas which is used in a reception device.

In this example, the reception device comprises two identical and independent antennas 600, 601 operating at millimetric waves in the frequency band corresponding to the onboard emission device. A reception device used within the framework of the invention will furthermore comprise processing means common to the antennas. The said antennas may be separate or else constitute a single physical assembly. They are pointed in the same direction of sighting but oriented perpendicularly with respect to one another in such a way that their respective gains are identical for two orthogonal rectilinear polarizations.

By way of example, the first antenna 600 operates with horizontal polarization and carries out the estimation of the bearing of the craft while the second antenna 601 operates with vertical polarization and carries out the estimation of the elevation of the craft.

Figure 7:
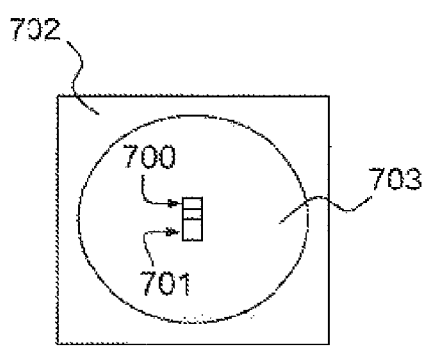
FIG. 7 presents a second exemplary configuration of antennas used in a reception device.

FIG. 7 presents a second exemplary configuration of antennas which is used in a reception device.

This alternative implementation consists in grouping the two receivers together in a single physical block 702, the two receivers being able in this case to share the same focusing device 703, with at the focus of the latter, two single-pulse sources 700, 701 with orthogonal polarizations.

Figure 8:
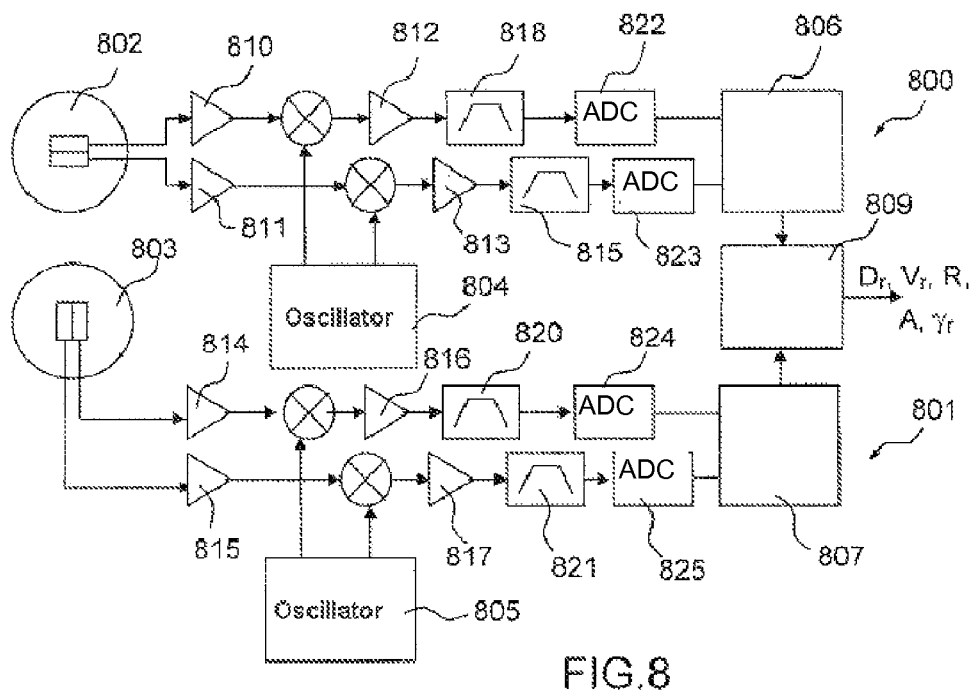
FIG. 8 presents an exemplary reception circuit comprising two single-pulse sources.

FIG. 8 presents an exemplary reception circuit comprising two single-pulse sources. This circuit comprises two reception chains 800, 801. Each chain comprises a frequency-controlled coherent reference oscillator 804, 805, low noise amplifiers 810, 811, 812, 813, 814, 815, 816, 817 and filters 818, 819, 820, 821, a mixer, analogue-digital conversion means 822, 823, 824, 825, means of signal coding and processing based on an FFT fast Fourier transform 806, 807, and common processing means 809. The common processing means make it possible to determine the distance traversed Dr by the flying craft, its radial speed Vr, its acceleration γr, the roll R, its Bearing A and its Elevation E.

Depending on the embodiment, the reception device can comprise more than two receivers, in particular to detect and reject the signals disturbed by reflections.

The frequency-controlled oscillator may be common to the receivers.

The operating principle of the reception device and the means used to estimate the parameters relating to the trajectory and the presentation of the craft are described hereinafter.

With regard to the detection of the signals emitted by the onboard emission device, emission is activated before firing is triggered, typically a few tens of milliseconds earlier. The emission frequencies Fi are known and contained in a frequency band ΔF around a mean frequency Fe.

At the level of the reception device, the frequency of the reference oscillators 804 and 805 is equal to a fixed value Fr, such that the frequency differences |Fi−Fr| all are less than the passband of the reception filters 818, 819, 820, 821.

When the onboard emitter is activated, the signals emitted by the latter are picked up by the antennas 802, 803, demodulated by the reference oscillators 804, 805, and transmitted to the FFT signal processing 806, 807.

A detection and a measurement of the beat frequencies Fb(0)=|Fi−Fr| are thus then performed whilst the speed of the craft Vr is still zero.

An estimation of the radial speed and of the distance traversed is undertaken next. The detection operation 809 at the FFT output 800, 801 is repeated at regular time intervals t=kTr, whilst the craft is in motion, revealing new beat frequencies.

In a general manner, these new beat frequencies can be determined at the instant t=k×Tr using the following expression:

$$Fb(kTr)=Fb(0)+Fd(kTr) \qquad (1)$$

in which:
Fd(kTr) represents the Doppler frequency,
k is an arbitrary integer, and
Tr is the time between two successive measurements.

Expression (1) is strictly valid only in so far as the effect of the acceleration on the emitted frequencies is negligible. This is the case for example when the oscillator used in the emission device is embodied on the basis of a quartz, whose sensitivity to acceleration is of the order of $10^{-10}$/g. In the converse case, it is always possible to compensate the estimation of the Doppler frequency by a correction table, knowing roughly a priori the evolution of the acceleration as a function of time and the characteristics of sensitivity of the emitter frequency variation as a function of acceleration.

Knowing that λ is the wavelength used, the radial speed Vr(kTr) of the craft at the instant kTr can then be deduced from the following relation:

$$Fd(kTr) = \frac{Vr(kTr)}{\lambda} \qquad (2)$$

In the same manner, the acceleration γr(kTr) at the instant kTr may be estimated using the expression:

$$\gamma r(kTr) = \frac{Vr((k+1)Tr) - Vr(kTr)}{Tr} \qquad (3)$$

The distance traversed at the instant (k+1)Tr may be estimated in a recursive manner using the expression:

$$Dr((k+1))Tr)=\tfrac{1}{2}\gamma r(kTr)Tr^2+Vr(kTr)Tr+Dr(kTr) \qquad (4)$$

The mean speed is estimated by calculating the central value of the frequency spectrum calculated at the FFT output over a duration Tr.

The result of the spectral analysis of this estimation in the time interval [kTr, (k+1)Tr] corresponds to the estimation of the radial speed at the time t=((k+½))Tr/2, Vr((k+½))Tr/2) i.e.:

$$Vr((k+\tfrac{1}{2})Tr)=\lambda Fd(kTr) \qquad (5)$$

For example, for a wavelength of 4 mm and a duration of analysis Tr=1.28 ms, the Doppler resolution ΔFd=1/Tr of an FFT filter is 781 Hz, this corresponding to a speed resolution ΔVr=λΔFd of 3.1 m/s. Typically, the precision of the estimation of the speed is equal to $1/10^{th}$ of the width of the analysis filter, i.e. 0.3 m/s.

An estimation of the elevation can then be undertaken. The signals received from the various antennas of the onboard emitter are separated at FFT output, directly if these signals correspond to sinusoids of different frequencies, or by a suitable correlator, if these signals have been coded in terms of phase, amplitude or frequency.

As a function of the angle of roll of the craft, at a given instant, the signals transmitted by at least one emission antenna are disturbed by the reflections off the ground. For an antenna situated at the height h1 with respect to the ground and for an emitter situated at the height h2 with respect to the ground, the periodicity of the interference fringes is given by the following expression:

$$D_i = \frac{2h_1 h_2}{\lambda i} \qquad (6)$$

in which:
i is a whole number corresponding to the i-th fringe and $D_i$ corresponds to the distance between the minimum of the (i−1)-th fringe and the minimum of the i-th fringe.

Figure 9:
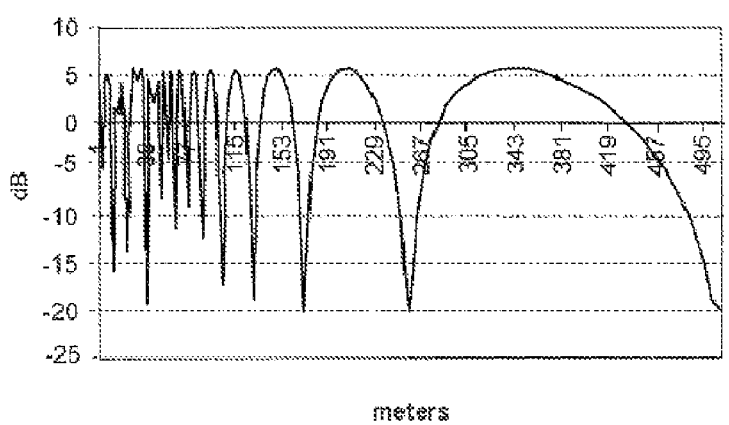
FIG. 9 shows for a reception coefficient of 0.9 and a wavelength of 4 mm, the shape of the interference fringes in a typical case where the craft flies 1 m above the ground, and where the reception device is likewise a height of 1 m from the ground.

FIG. 9 shows, for a reception coefficient of 0.9 and a wavelength of 4 mm, the shape of the interference fringes in a typical case where the craft flies 1 m above the ground, and where the receiver is likewise at a height of 1 m from the ground.

A first solution for rejecting the measurements consists in verifying the amplitude coherence of the signal received over time.

The craft moving with a very high speed, typically greater than 100 m/s, the amplitude of the signal received varies in fact very rapidly as a function of time, in the presence of reflections off the ground, in particular in the first instants following exit from the launch tube.

A second possibility consists in using at reception at least two identical antennas of like polarization, disposed at two different heights, and in rejecting the measurements corresponding to signals of different amplitudes received simultaneously on the two antennas. The estimation of the elevation is then obtained by single-pulse measurement on the signals whose amplitude appears identical on the two antennas.

Figure 10:
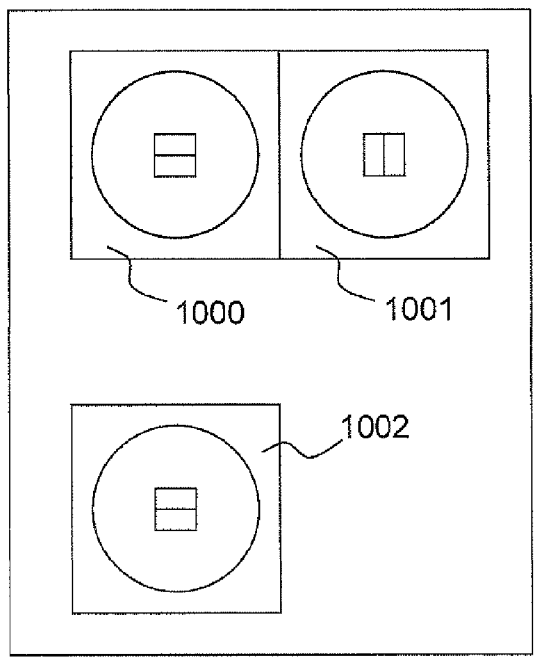
FIG. 10 presents an exemplary reception device then comprising three receivers, two of which are used for elevation measurement.

The reception device then comprises at least three receivers 1000, 1001, 1002, two of which are used for the elevation measurement, as shown by the example of FIG. 10.

Figure 11:
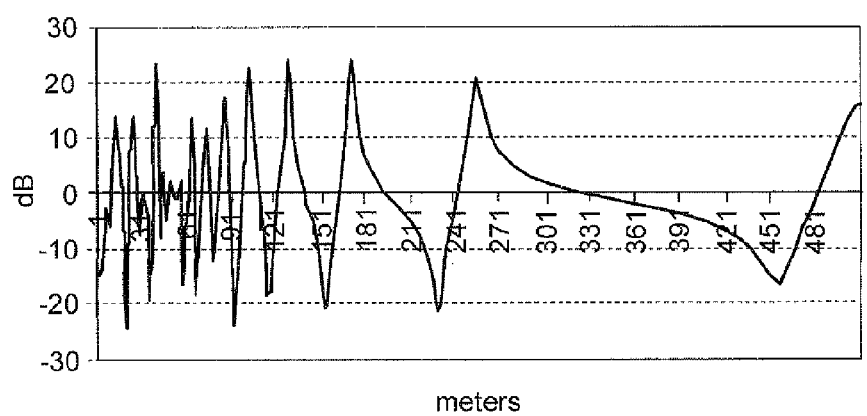
FIG. 11 presents the difference of the amplitude levels received as a function of distance for two antennas spaced 10 cm apart in terms of height.

FIG. 11 presents the difference of the amplitude levels received as a function of time for two antennas spaced 10 cm apart in terms of height. Advantageously, the two alternatives making it possible to reject the signals disturbed by the reflections may be used jointly.

With regard to the estimation of the bearing, the technique of measurement by single-pulse deviometry is used. Just as for the elevation measurement, it is possible if necessary to eliminate the measurements which are disturbed by lateral reflections with the same schemes.

Figure 12:
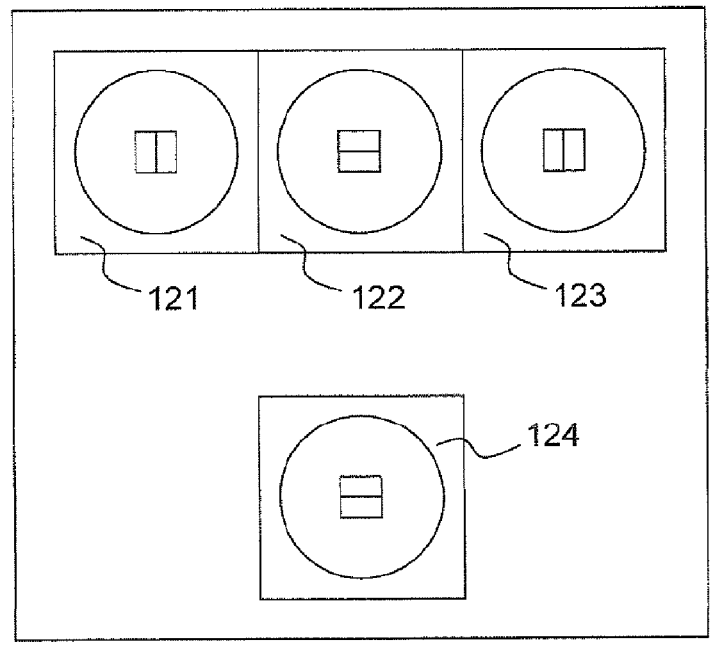
FIG. 12 presents an exemplary configuration of antennas belonging to the reception device and making it possible to circumvent at one and the same time the reflections off the ground and lateral reflections through the position diversity of the antennas.

FIG. 12 presents an exemplary configuration of antennas belonging to the reception device and making it possible to circumvent at one and the same time the reflections off the ground and lateral reflections through the position diversity of the antennas. In this case, the reception device 120 comprises 4 antennas 121, 122, 123, 124. Two antennas 122, 124 with vertical polarization are distributed at different heights and allow the measurement of elevation, that is to say the angle of elevation of the flying craft with respect to the radioelectric axis of the antennas. The other two antennas 121, 123 are with horizontal polarization and distributed on a horizontal plane to allow measurement of the bearing.

Figure 13:
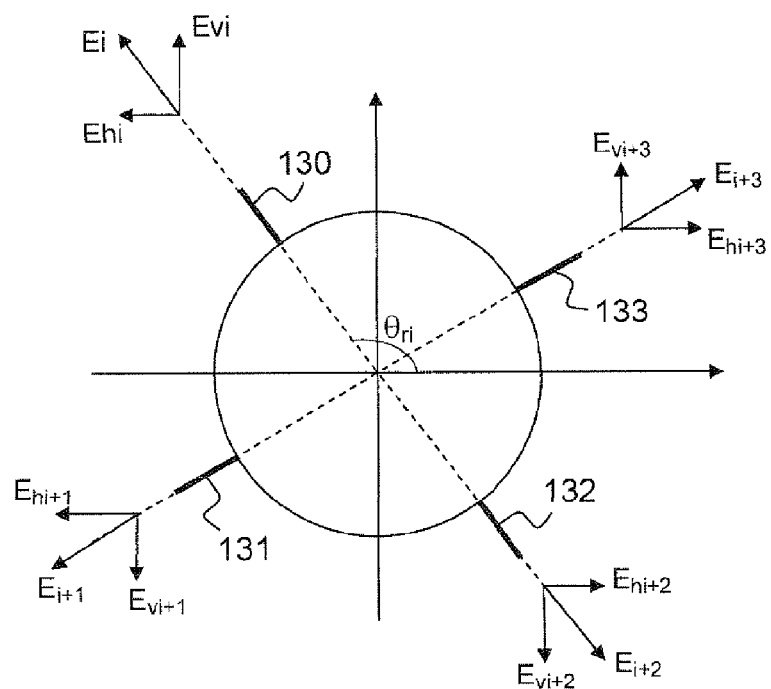
FIG. 13 illustrates the principle of estimating the roll.

FIG. 13 illustrates the principle of roll estimation. The emission device preferably uses antennas with local vertical polarization, that is to say for each along an axis perpendicular to the plane tangential to the fuselage at their point of location on the latter. The polarization of the wave received by the reception device comprises for each emission antenna 130, 131, 132, 133 a component with vertical polarization Ev, and a component with horizontal polarization Eh, dependent on the angle of roll. The amplitude ratio for the two components of the electric field of each signal makes it possible to estimate the roll.

By taking as reference for the angle of roll $\theta_{ri}$ the angle between the horizontal axis perpendicular to the axis of the fuselage and the axis of the antenna i, the electric field radiated by the antenna i $E_i$ comprises a vertical component $E_{vi}$ and a horizontal component $E_{hi}$ such that:

$$E_{hi} = E_i \cos(\theta_{ri}) \quad (7)$$

$$E_{vi} = E_i \sin(\theta_{ri}) \quad (8)$$

At reception, at a given instant t, an antenna polarized with horizontal polarization receives from antenna i a signal of the form:

$$R_{hi} = KE_i \cos(\theta_{ri}) \quad (9)$$

The antenna polarized with horizontal polarization receives from the same antenna i a signal that can be expressed with the aid of the following expression:

$$R_{vi} = KE_i \sin(\theta_{ri}) \quad (10)$$

in which K is a constant which takes the propagation losses into account.

The angle of roll can then be evaluated to within π using the expressions:

$$\theta_{ri} = arctg\left(\frac{R_{vi}}{R_{hi}}\right) \quad (11)$$

$$\theta_{ri} = arctg\left(\frac{R_{vi}}{R_{hi}}\right) + \pi \quad (12)$$

The same calculation can be performed on the signals arising from the various antennas of the emission device, so as to consolidate the measurement.

Moreover, it is possible to estimate the rotation rate at which the craft is spinning, either directly by repeating the measurement at regular time intervals and by estimating the angle of roll traversed during this regular time interval, or by measuring the rotation frequency by Fourier transform of the amplitude of the signals received from one and the same antenna over time.

The ambiguity in the measurement of the angle of roll can then be removed on the basis of the knowledge of the initial angle of roll and of the direction of rotation of the object, by integrating the roll rate estimated over time.

It is also possible to directly measure the position of each antenna when the object is still at small distance, typically below 100 m, and then to count the number of spin revolutions performed by the craft over time.

Indeed, each antenna temporally describes a circle centred on the fuselage of the object and it is possible to estimate at a given instant the corresponding angular position by using in reception an interferometric base for example according to FIG. 12.

Typically, for a rotation circle of diameter 10 cm, the angular position of two opposite antennas with respect to the fuselage differs by 1 mrad at 100 m, this being detectable by the measurement on condition that a measurement base of sufficient length is available, typically of the order of 20 cm at 80 GHz.

Once the initial position ambiguity has been removed by this scheme it suffices to integrate the number of revolutions by counting the half-rotations so as to deduce the instantaneous position of each of the antennas.

This solution can also be improved through the measurement by comparing in differential the amplitude variations of the signals received corresponding to the antennas which are symmetrically opposite with respect to the fuselage. When the antenna is oriented upwards, the corresponding signal received is not affected by the reflections off the ground, whilst the reflections off the ground have an inevitable influence for the downward oriented antenna. Once this discrimination has been established, even temporarily such as shown in FIG. 9, a counting of the half-revolutions can be performed by measuring the polarization of the wave received.

A third solution consists in applying a deviation in a given direction and correlating the measurements with the reaction of the craft. The indeterminacy is then immediately removed. This detection can be done instantaneously if we have for example 4 emission antennas distributed uniformly over the cross-section of the fuselage or sequentially if we have only two antennas symmetric with respect to the fuselage.

As a function of the rotation rate and of the speed of the craft, a solution with a single antenna can also be envisaged, constraining the system to make sequential measurements.

Finally, it is possible to remove the ambiguity in the angle of roll on the basis of an onboard sensor of accelerometer or magnetometer type for example, this sensor delivering angular position information of low precision, but sufficient to remove "up-down" or "left right" ambiguity.

The invention claimed is:

1. A flying craft comprising:
a plurality of antennas distributed around a fuselage of the flying craft and configured to emit signals rearwards from the flying craft with rectilinear polarization, the emitted signals being specific to each antenna, positions and dimensions of the antennas being configured such that the fuselage of the flying craft avoids by masking for at least a first one of the antennas reflections of the signal emitted by the first antenna off the ground or off lateral obstacles irrespective of a position of the flying craft; and
a reception device comprising:
a plurality of monopulse antennas pointed in a same direction of sighting and operating in orthogonal planes; and
means for identifying and processing, separately, signals received from respective antennas of the flying craft, such that signals emitted by separate antennas are identified and processed separately, and for automatically detecting and rejecting received signals disturbed by reflections.

2. The flying craft according to claim 1, wherein the antennas are embodied on a basis of rectilinear microwave leakage lines, and are disposed substantially perpendicular to the fuselage of the flying craft.

3. The flying craft according to claim 1, further comprising fins serving to guide the flying craft, wherein the antennas are fixed to the fins.

* * * * *